H. A. MARTIN.
CREDIT ACCOUNT REGISTER.
APPLICATION FILED APR. 12, 1916.

1,341,922.

Patented June 1, 1920.
2 SHEETS—SHEET 1.

Inventor
HAAKON A. MARTIN
by R. C. Glass
and Earl Beust
Attorneys.

H. A. MARTIN.
CREDIT ACCOUNT REGISTER.
APPLICATION FILED APR. 12, 1916.
1,341,922.
Patented June 1, 1920.
2 SHEETS—SHEET 2.
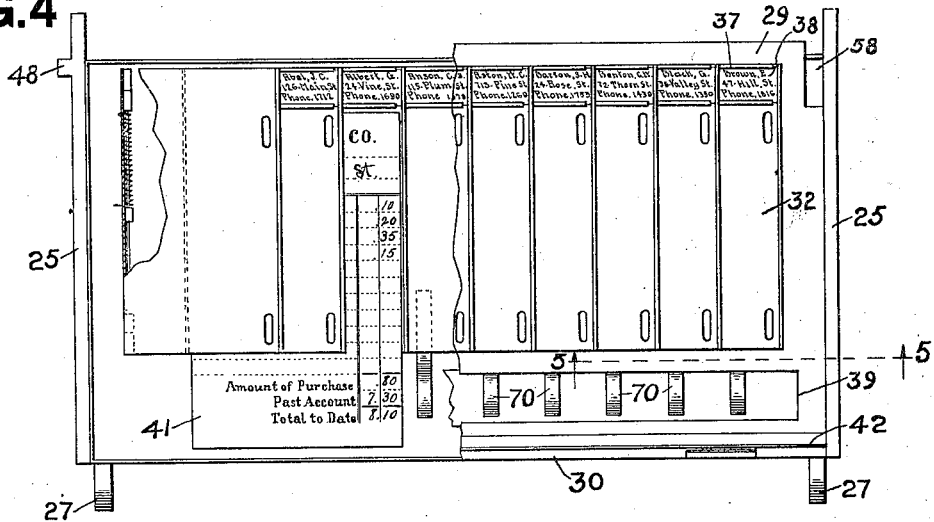
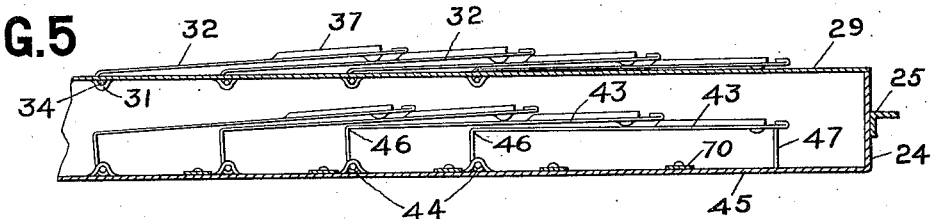
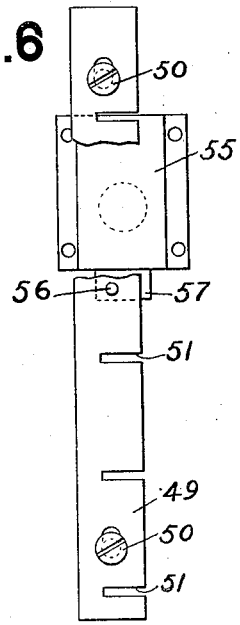
Inventor
HAAKON A. MARTIN
Attorneys

UNITED STATES PATENT OFFICE.

HAAKON A. MARTIN, OF DAYTON, OHIO, ASSIGNOR TO THE NATIONAL CASH REGISTER COMPANY, OF DAYTON, OHIO.

CREDIT-ACCOUNT REGISTER.

1,341,922.　　　　Specification of Letters Patent.　　Patented June 1, 1920.

Application filed April 12, 1916. Serial No. 90,555.

*To all whom it may concern:*

Be it known that I, HAAKON A. MARTIN, a citizen of the United States, residing at Dayton, in the county of Montgomery and State of Ohio, have invented certain new and useful Improvements in Credit-Account Registers, of which I declare the following to be a full, clear, and exact description.

This invention relates to credit account registers or filing cabinets and has more particular relation to that class of filing cabinets which are provided for a classified filing of charge slips for credit sales in retail stores such as groceries, meat markets and the like.

It is customary to provide filing cabinets having a large number of small compartments arranged each to receive the slips pertaining to a single account. These small compartments are generally of sufficient size to retain the slips for an account running from a period of a week to a month according to the time when the account was payable. In such an arrangement it has been found that by reason of collusion between the customers and clerks old slips were frequently destroyed, thus destroying all record of the account.

It is the purpose of the present invention to provide a filing cabinet of the above cited class which will give some measure of protection to the proprietor of the store in which the filing cabinet is employed. In the accomplishment of this purpose it is a further purpose to provide a filing cabinet comprising a plurality of filing units which are provided with two sections, one to receive slips filled out for charge sales during the day and the other section to receive the charge slips which are transferred at the end of the day to the second section, which will herein be called the permanent filing section of the unit. The permanent filing section is normally inaccessible to the clerks and is of sufficient size to adapt it to retain sales slips for any desired period of time.

The general purpose of the present construction is quite similar to that of an invention shown, described and claimed in a copending application of the present applicant, Serial No. 89,270 filed April 6, 1916. Several of the details of construction shown herein are common to both the present application and the above noted copending application. Any claim common to the two structures will be found in the copending application, the details common to the two devices being shown and described herein merely for the sake of illustration.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:

Fig. 4 is a detail top plan view of a filing unit, part of the temporary section being broken away for the sake of clearness.

Fig. 5 is a lateral cross section (full-sized) of one of the filing units on the line 5—5 of Fig. 4, showing the filing pockets in both the temporary and permanent filing section.

Fig. 6 is a detail of the locking device for normally preventing access to the permanent filing sections.

The filing device is provided with a suitable inclosing casing 20 having hinged doors 21 and 22, hinged in such a manner as to permit of their being folded back over the top of the inclosing casing 20. The inclosing casing, including the doors 21 and 22 may be made of any form of fire-proof material if desired. Any material or design for cabinet purposes however may be used without departing from the spirit of the present invention.

Figure 1:
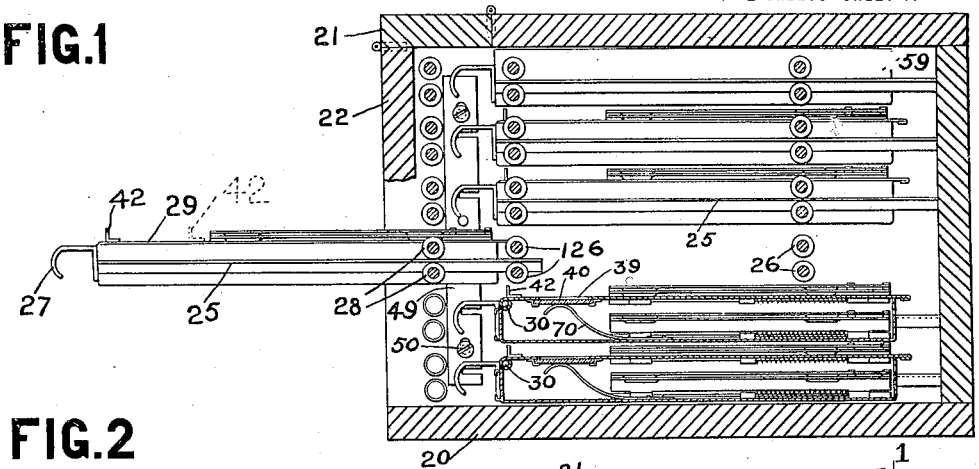
Figure 1 is a cross section of the machine approximately on the line 1—1 of Fig. 2.
Figure 2:
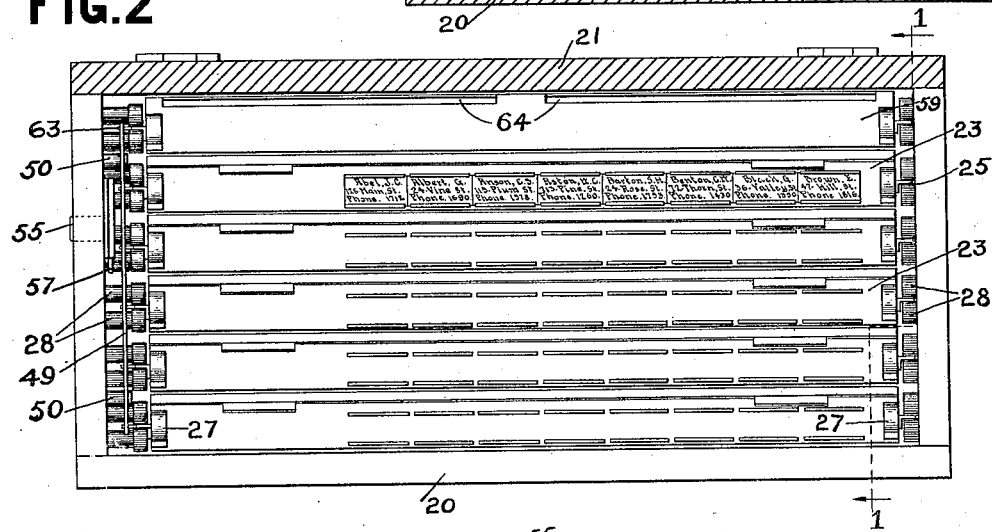
Fig. 2 is a front elevation of the filing device with the front cover removed for the sake of clearness.

The inclosing casing 20 may be of sufficient size to contain any number of filing units according to the capacity desired. As shown in Figs. 1 and 2 five filing units 23 have been provided as these are sufficient to illustrate the invention. Each of the filing units 23 is in the form of a drawer tray 24, provided on either side with angle bars 25 forming slides on either side of the filing unit, the slides 25 passing between sets of rollers 26 and 126 and 28. As will be noted in Fig. 1 the filing units 23 are normally supported by two pairs of rollers 26 and 126, one of each of said pairs of rollers being beneath the guide 25 and the other of each pair being above the guide 25. The filing unit 23 is provided with finger pulls 27, fast on the front side of the tray 24. By the provision of the pulls 27, it will be noted that the filing units 23 may be drawn out to the position shown in Fig. 3 in which position its movement is arrested, as hereinafter described.

In open position the filing unit 23, which has been withdrawn, will be supported by the rollers 126, and an additional pair of rollers 28 mounted in the forward part of the cabinet. When the filing unit 23 is in the position shown in Fig. 3, the filing pockets of the temporary filing section will be exposed.

The temporary filing section and its pockets are constructed as follows: The temporary filing section comprises the top plate 29, hinged at 30 to the forward edge of the tray 24, thus forming a cover for the latter (Figs. 1, 3, 4 and 5). The plate 29 is formed with eyes 31 (Fig. 5) to form hinging points for a series of leaves 32, formed at one side with eyes 33. The leaves 32 are hinged to the top plate 29 of the temporary section by passing pivot pins 34 through the eyes 31 formed on the plate 29 and through the eyes 33 formed on the leaves 32. The pins 34 are surrounded by coiled springs 36 (Fig. 3) anchored at its ends, (as shown in Fig. 4, with reference to the pockets of the permanent section) thereby tending to press the leaves 32 flat against the top plate 29. Each of the plates 32 is formed near its upper right hand corner with rolls 37 to form a pocket to hold name and address slips or labels 38 to identify the pockets. Just forward of the leaves 32 the plate 29 is provided with a sight opening 39 which is preferably covered with a strip of glass or other material 40 permitting sight therethrough to provide a protected sight opening through which the sales slip 41, on file in the pockets of the permanent filing section formed in the tray 24, may be viewed. When the slips are inserted in the pockets formed by the leaves 32 of the temporary filing section they will lay over the sight opening 39 and rest against the flange 42 formed along the forward edge of the top plate 29. The flange 42, however, may be placed to the rear of the sight opening, as shown in dotted lines in Figs. 1 and 3, if desired without departing from the spirit of the invention. The pockets in the permanent section are formed with leaves 43, which are pivoted at 44 to the base 45 of the tray 24. The leaves 43 are substantially the same in operation and method of pivoting as the leaves 32 of the temporary filing section. The one difference in construction between the leaves 32 of the temporary filing section and the leaves 43 of the permanent filing section is that the latter leaves are formed with an angle 46 to increase the filing capacity of the pockets of the permanent filing section so that a greater number of slips may be filed in the pockets of the permanent filing section than may be filed in the pockets of the temporary filing section. In order to support the right hand edge of the right hand leaves 43 of the permanent filing section a support 47 is struck up from the base 45 of the drawer 24 so as to hold the leaf in the position shown in Fig. 5.

In order to render the permanent filing section of the filing units 23 inaccessible, means are provided for preventing the withdrawal of the filing units 23 to an extent sufficient to permit the temporary sections being swung about their pivots 30. The means for preventing the complete withdrawal of the units 23 is as follows: Each of the left hand slides 25 of the filing units 23 is provided with a laterally extending lug 48, which when the filing unit 23 is withdrawn to the position shown in Fig. 3, will strike a vertically sliding plate 49 (Figs. 1, 3 and 6) located just inside the left hand side of the cabinet. When a unit is in the position shown in Fig. 3, there is not sufficient clearance for the swinging of a temporary section about its pivot. The slide 49 is slotted to permit of its movement on studs 50, mounted on the left hand side of the cabinet 20. The slide 49 is provided with a series of horizontal slots 51 which normally stand just above the path of movement of the lugs 48. In this position of the slides it will, of course, be seen that the lugs 48 engaging the rear edge of the slide 49, the withdrawal of the unit 23 to an extent permitting access to the permanent filing section will be prevented. The slide 49 is held in a position, shown in Figs. 1 and 6, by the bolt 57 of a lock 55 to which said slide 49 is connected by a pin 56, projecting from the bolt 57 of said lock. When it is desired to render the permanent filing sections accessible the proprietor inserts his key in the lock 55 and operates the bolt 57. This will act to lower the bolt 57 and consequently through the medium of the pin 56, the slide 49 will be lowered to bring the slots 51 of said slide into the path of the lugs 48. A further withdrawal of the units 23 is thus permitted until the lugs 48 strike the forward ends of the slots 51 in the slide 49. The top plate 29 will then be in a position in which it will be out from under the base of the unit located just above the one withdrawn. Each of the top plates 29 is cut away as at 58 (Figs. 3 and 4) to provide clearance for the finger pulls 27 on the fronts of the units 23. The permanent filing section of each unit is provided with springs 70 which serve to hold the slips in a permanent section in contact with the coverings 40 of the sight openings 39.

The upper drawer 59 (Figs. 1 and 2) is constructed differently than the filing units 23. The drawer 59 is provided as a suitable filing space for filing "C. O. D." charge slips. It is frequently found that while the deliveryman is making his deliveries, the copies of "C. O. D." slips on charge sales will become lost or misplaced. It is therefore not only desirable to provide a suitable filing space for "C. O. D." slips but to provide a filing space which is not accessible. The drawer 59 is therefore provided, which drawer 59 comprises a tray 60 covered at its forward end by a strip 61. The drawer 59 is provided with slides 25 similar to the filing units except that instead of being provided with a lug 48, the angle bar 62 carries a lug 63 (Fig. 3) near the forward end of its left hand slide. The lug 63 is adapted to strike slide 49 in the same manner as the lugs 48. The lug 63, however, being placed near the forward side of the drawer, serves to prevent withdrawal of the drawer 59 to an extent beyond the strip 61, thus preventing access to the open portion of tray 60. Along its forward edge tray 60 of the drawer 59 is provided with slots 64 through which the "C. O. D." slips may be inserted when the goods are made up for delivery. When the deliveryman returns and is ready to be checked up the proprietor lowers the slide 49 by again operating the lock 55 thus lowering the slide 49 to an extent sufficient to withdraw the upper end of said slide from the path of lug 63, thereby permitting the complete withdrawal of the "C. O. D." drawer so as to permit removal of the slips filed therein.

The general operation and use of the above described credit account register or filing cabinet is as follows: In the normal condition of the machine the slide 49 is in the position shown in Figs. 1 and 3, in which position the notches 51 formed in the slide 49 will be out of alinement with the lugs or stops 48 carried by the filing units. When a charge sale is made a sales slip is made out in the usual way and is properly filed in the pockets 32 of the temporary filing section of one of the units, the clerk being guided by the labels 38 in selecting the proper pocket for the account involved. In making out the sales slips, of course, the clerk first observes the condition of the account, noting the past account to date, which either appears on the top slip in the permanent filing section through the sight opening 39 or on a slip made out earlier on the same day, which slip would appear in the proper pocket of the temporary filing section.

Figure 3:
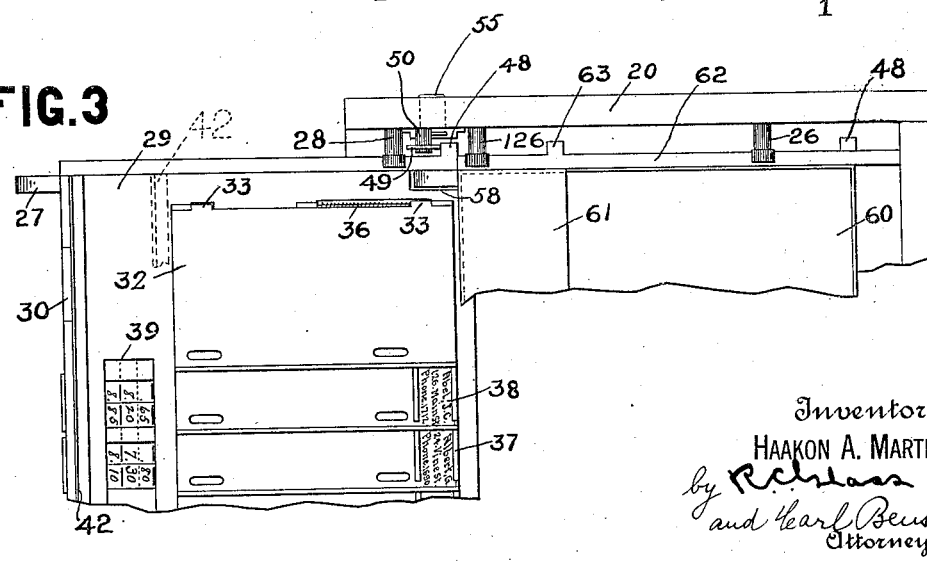
Fig. 3 is a top plan view of parts of the top filing section and the one immediately beneath the top section.

The slide 49 being in the position shown in Fig. 3, the unit when withdrawn will be arrested in the position shown in Fig. 3. In this position the lug 48 of that unit will be in contact with the slide 49 as shown. This will hold the withdrawn unit in such a position that the rear edge of the temporary filing section will still be under the forward edge of the filing unit just above the one withdrawn. For this reason the forward edge of the unit just above the one withdrawn will act as an obstruction to the temporary filing section of the withdrawn unit and prevent the same being swung about its pivot 30 to expose the contents of the permanent filing section.

When, at the end of the day, the proprietor desires to audit the accounts and transfer the slips from the temporary filing sections to the permanent filing sections he inserts his key in the lock 55 and turns the same. This will affect a lowering of the slide 49 and will bring all of the notches 51 therein in alinement with the lugs 48. This will permit the withdrawal of the filing units to their fullest possible extent in which positions, the rear edge of the temporary filing section of each filing unit will pass out beyond the forward edge of the unit just above it. This will permit of the swinging of the temporary filing section about its pivot 30, thereby permitting access to the permanent filing units.

While the form of mechanism herein shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:

1. In a credit account register, the combination with a suitable casing, of filing units slidably mounted therein and each comprising a plurality of sections, stops on the filing units, a strip slidably mounted in the path of movement of said stops to limit the outward movement of the filing units to less than the full extent of their withdrawal in which position said cabinet renders a section of said unit inaccessible, notches in said strip normally out of alinement with said stops, said strip being adjustable at will to bring said notches into alinement with said stops whereby additional outward movement of said filing units is permitted, in which latter position the inaccessible section is rendered accessible.

2. In a credit account register, the combination of a suitable casing, filing units slidably mounted therein, each filing unit comprising a temporary and a permanent filing section, said temporary section being movably mounted with relation to said permanent section so that it may be moved to prevent and permit access to said permanent section and said temporary section prevented from movement to permit access to said permanent section until said unit has been slid outwardly to its fullest extent, means for normally preventing said full outward movement and means for disabling said preventing means, and permit access to said permanent sections.

3. In a credit account register, the combination of a suitable casing, filing units slidably mounted therein, each filing unit comprising a temporary and a permanent filing section, said temporary section being movably mounted with relation to said permanent section so that it may be moved to prevent and permit access to said permanent section and said temporary section prevented from movement to permit access to said permanent section until said unit has been slid outwardly to its fullest extent, a lock, and means under control of said lock normally preventing said full outward movement, said means being adjustable at will under control of said lock to permit full outward movement of the units and permit access to said permanent sections.

4. In a credit account register, the combination of a suitable casing, filing units slidably mounted therein, each filing unit comprising a temporary and a permanent filing section, said temporary section being movably mounted with relation to said permanent section so that it may be moved to prevent and permit access to said permanent section and said temporary section prevented from movement to permit access to said permanent section until said unit has been slid outwardly to its fullest extent, a lock, means operatively connected to said lock for normally limiting the extent of outward movement of said units, said limiting means being adjustable by an operation of said lock to permit full movement of the units and access to said permanent sections.

5. In a credit account register, the combination of a suitable casing, filing units slidably mounted therein, each filing unit comprising a temporary and a permanent filing section, said temporary section being movably mounted with relation to said permanent section so that it may be moved to prevent and permit access to said permanent section, and said temporary section prevented from movement to permit access to said permanent section until said unit has been slid outwardly to its full extent, means for normally preventing said full outward movement, said means being adjustable to allow full outward movement of the units and permit access to said permanent sections.

6. In a credit account register, the combination of a suitable casing, filing units mounted to be movable into and out of said casing, each filing unit comprising a temporary and a permanent filing section, said temporary section being movably mounted with relation to said permanent section so that it may be moved to prevent and permit access to said permanent section, and said temporary section prevented from movement to permit access to said permanent section until said unit has been moved out of said casing to its full extent, means for normally preventing said full outward movement, said means being adjustable to allow full outward movement of the units and permit access to said permanent sections.

7. In a credit account register, the combination of a suitable casing, a filing unit comprising two sections mounted to be movable into and out of the said casing, and means for normally limiting the extent of outward movement of said unit for permitting access to one section, said limiting means being adjustable at will to permit of a still further outward movement of the filing unit and thereby allow access to the other section.

8. In a credit account register, the combination of a suitable casing, a filing unit mounted to be movable into and out of the said casing, said filing unit comprising a permanent filing section and a temporay filing section pivoted thereto, means for limiting the outward movement of the filing unit and thereby preventing movement of the temporary filing section on its pivot and means for adjusting the limiting means to allow a still further movement of the filing unit and thereby permit a movement of the temporary section on its pivot.

9. In a credit account register, the combination of a suitable casing, a plurality of superposed filing units mounted to be movable into and out of the said casing, said filing unit comprising a permanent filing section and a temporary filing section, said temporary filing section movable in respect to said permanent section to prevent and permit access thereto, means for limiting the outward movement of the filing unit whereby the temporary filing section is prevented by the filing unit above it from movement to permit access to the permanent section, and means for adjusting the limiting means to permit a still further movement of the filing unit and thereby allow movement of the temporary section to permit access to the permanent section.

10. In a credit account register, the combination of a suitable casing, a plurality of superposed filing units mounted to be movable into and out of the said casing, said filing unit comprising a permanent filing section and a temporary filing section pivoted thereto, means for limiting the outward movement of the filing unit whereby the temporary filing section is prevented by the filing unit above it from movement on its pivot, and means for adjusting the limiting means to permit a still further movement of the filing unit and thereby permit the movement of the temporary filing unit on its pivot.

11. In a credit account register, the combination of a suitable casing, a filing unit comprising two sections slidably mounted therein, and means for normally limiting the extent of outward movement of said unit and permitting access to one section thereof, said limiting means being adjustable at will to permit of a still further outward movement of the filing unit and thereby permitting access to the other section thereof.

12. In a credit account register, the combination of a suitable casing, filing units slidably mounted therein, each of said units comprising two sections, stops on the filing units, and means normally coöperating with said stops to limit the extent of outward movement of the units and permitting access to one section thereof, said limiting means being adjustable at will to permit of a still further outward movement of the filing units and thereby permitting access to the other section thereof.

In testimony whereof I affix my signature.

HAAKON A. MARTIN.